Dec. 8, 1953    J. C. LEARY    2,661,680
TWISTER MECHANISM AND BALE TIE
Filed Jan. 27, 1951    5 Sheets-Sheet 1

INVENTOR.
JOSEPH C. LEARY,
BY: Harold B. Hood.
ATTORNEY.

Dec. 8, 1953  J. C. LEARY  2,661,680
TWISTER MECHANISM AND BALE TIE
Filed Jan. 27, 1951  5 Sheets-Sheet 2

INVENTOR.
JOSEPH C. LEARY,
BY: Harold B. Hood.
ATTORNEY.

Dec. 8, 1953  J. C. LEARY  2,661,680
TWISTER MECHANISM AND BALE TIE
Filed Jan. 27, 1951  5 Sheets-Sheet 3
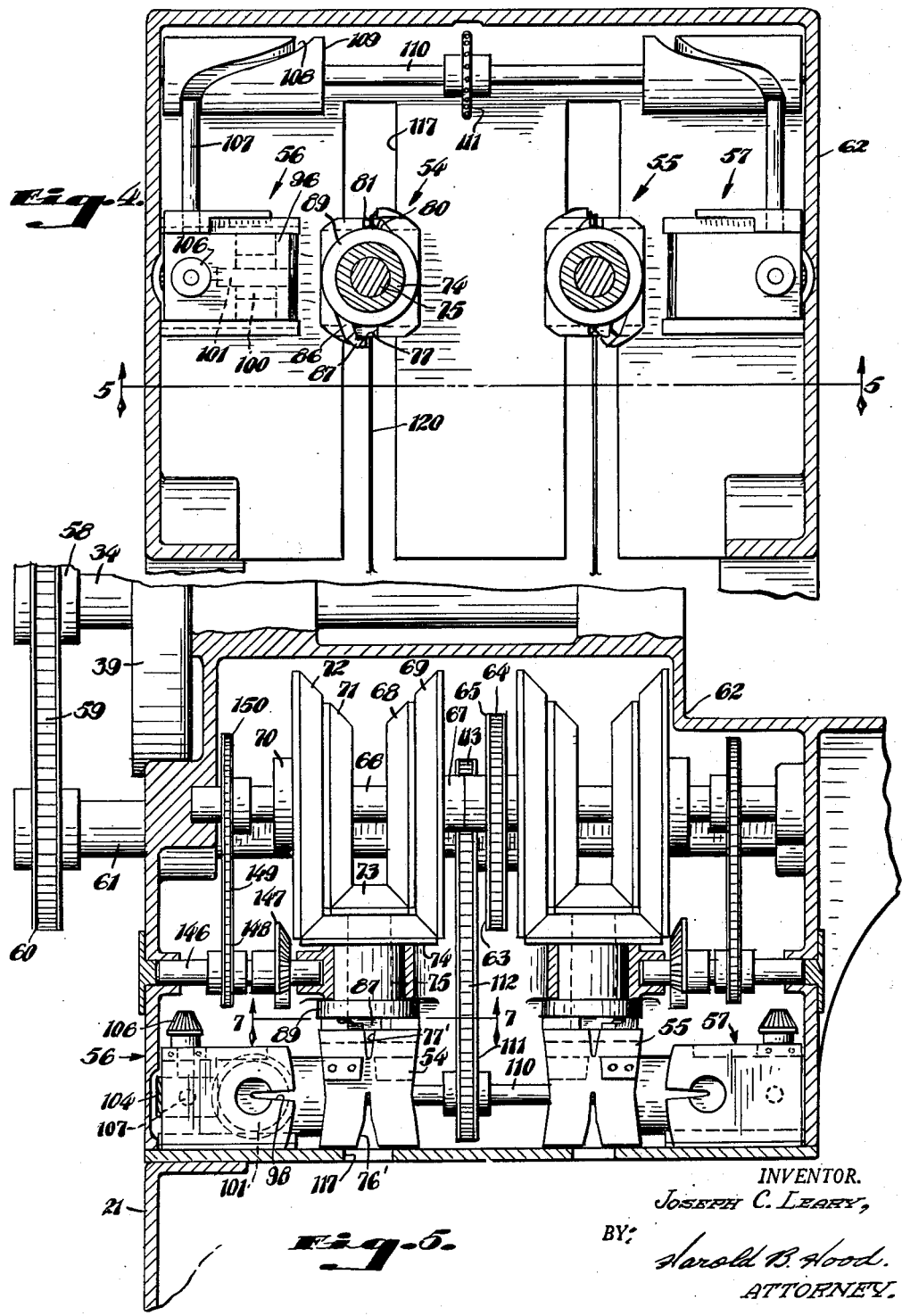
INVENTOR.
JOSEPH C. LEARY,
BY:
Harold B. Hood.
ATTORNEY.

Dec. 8, 1953  J. C. LEARY  2,661,680
TWISTER MECHANISM AND BALE TIE
Filed Jan. 27, 1951  5 Sheets-Sheet 4
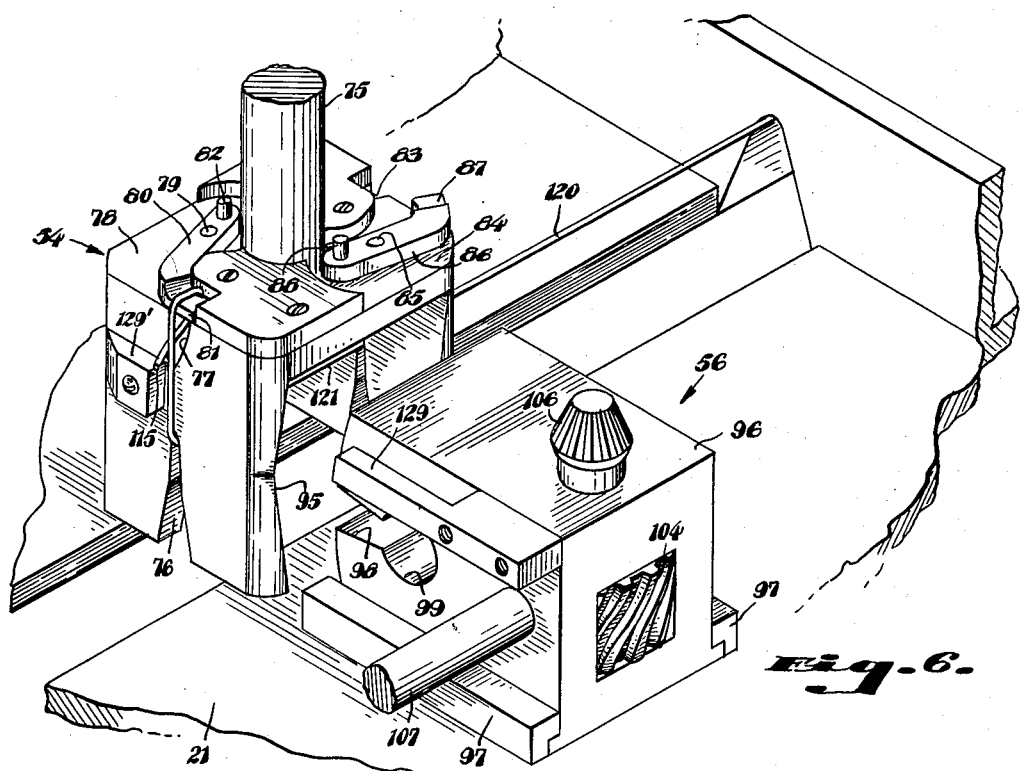
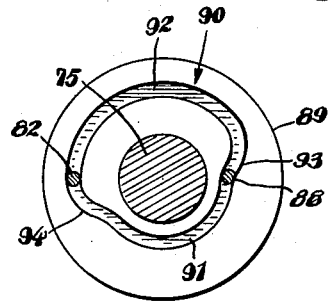
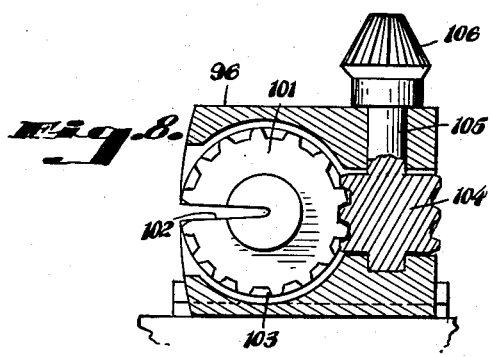
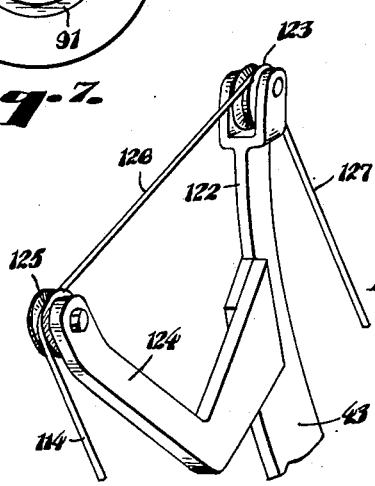
INVENTOR.
JOSEPH C. LEARY,
BY:
Harold R. Hood
ATTORNEY.

Dec. 8, 1953  J. C. LEARY  2,661,680
TWISTER MECHANISM AND BALE TIE
Filed Jan. 27, 1951  5 Sheets-Sheet 5
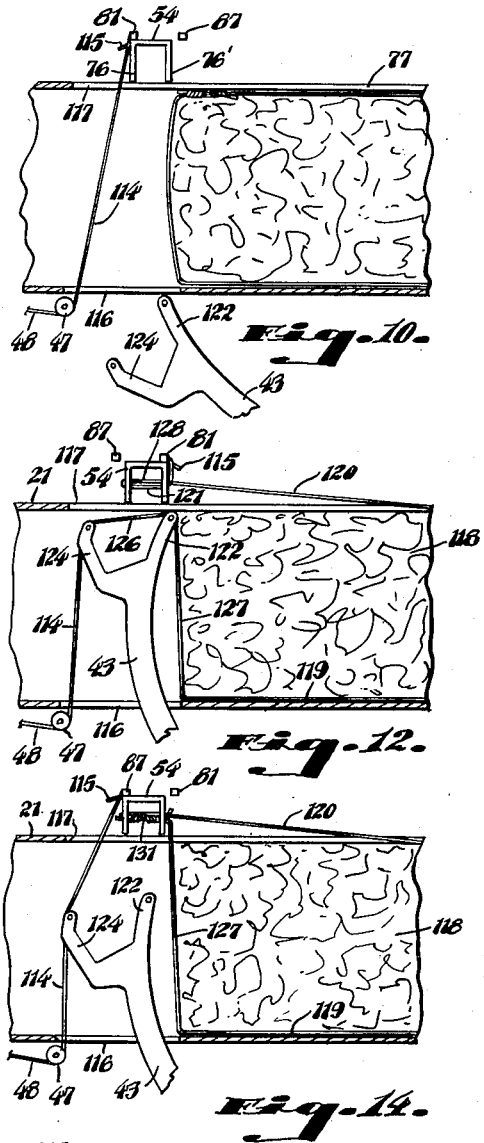
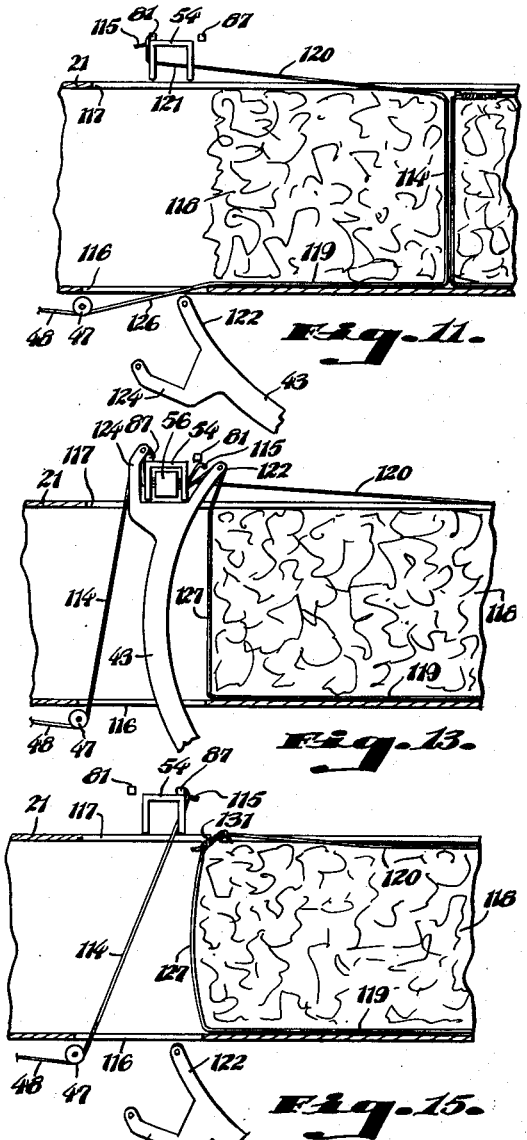
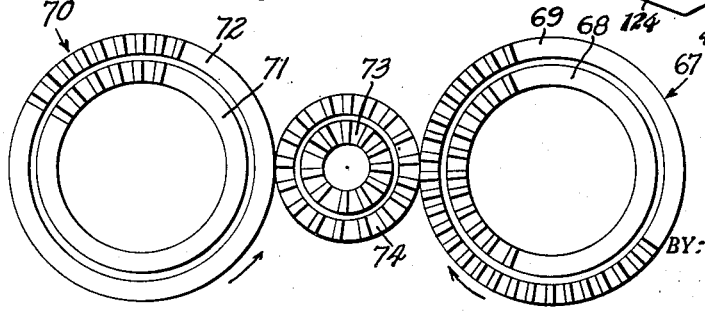
INVENTOR.
JOSEPH C. LEARY,
BY:
Harold B. Hood.
ATTORNEY.

Patented Dec. 8, 1953

2,661,680

UNITED STATES PATENT OFFICE 2,661,680

TWISTER MECHANISM AND BALE TIE

Joseph C. Leary, Greenfield, Ind.

Application January 27, 1951, Serial No. 208,155

20 Claims. (Cl. 100—20)

The present invention relates to bale tie mechanism, and is primarily concerned with the provision of means adapted to be associated with a baler and operable to join the ends of a strand of wire surrounding a bale of material formed in a baling machine. The primary object of the invention is to provide automatically operating means for producing a twisted joint or connection of optimum type in a strand of wire binding a bale.

The mechanism of the present invention is primarily adapted for association with a transit or automotive type of pick-up baling machine in which, as the machine travels through a field in which hay or other material lies in windrows, the machine picks up the material, feeds it to a baling chamber in which a plunger reciprocates to compress the material, and advances it step-by-step through the baling chamber. One or more retaining wires are arranged in the baling chamber to form bights surrounding the leading end and two sides of the mass of material being compressed as that material moves through the baling chamber; and measuring means caried on the baling chamber activates a needle for each wire strand, after passage of a predetermined mass of material. When the needles are activated, each of them carries a section of wire across the baling chamber behind the mass of compressed material, to bring such section into cooperative association with an anchored strand end, and suitable means is then actuated to join that section to the anchored end.

My present invention is particularly directed toward the means for associating the portions of the strand thus to be joined, and toward the means for joining such strand portions.

According to the present invention, twister mechanism is provided for joining such strand portions, and the invention includes means for cutting the wire at a point between the twister mechanism and a point of engagement of the needle with the strand, together with means for anchoring the severed end of the strand. The invention also contemplates novel twister mechanism, as will appear from the description to follow.

An important feature of the invention comprises novel anchorage means so actuated that the wire portions to be twisted together are laid in the twister mechanism with their extremities pointing in opposite directions. Devices have heretofore been known, for use in the environment here under consideration, so constructed as automatically to twist together terminal portions of a wire strand encompassing a bale, but those devices, with few exceptions, act upon wire ends which are brought together with their extremities pointing in a common direction. When wire portions are twisted together in such a relation, the wire is subjected to a cutting stress so that, particularly when sudden shocks are impressed upon the bale, or when heavy pressures are exerted thereon, the binding wire will break or be cut at the point of jointure. An entirely different kind of holding action is produced when the wire ends are twisted together with their termini pointing in opposite directions. Such a twisting is comparable to a threaded connection, in which separating or breaking forces are divided more or less equally among the several turns in which the wire ends are joined together; and as a consequence, it has been found that such a joint will remain undisturbed even by forces applied to or through the bale of such magnitude as to break the wire elsewhere in its length. The primary object of the present invention, then, is to provide mechanism which will bring together opposite end sections of a bale-encompassing wire strand, with their termini pointig in opposite directions, and will lay those sections in a twister mechanism in that relation. A further object of the invention is to provide novel means for twisting together such end sections in such relation. A further object of the invention is to provide novel anchorage means for an end of a bale-encompassing strand, together with means for actuating such anchorage means to reverse the position of the section of a strand anchored thereon, before the opposite end section of the bale-encompassing strand is brought into cooperative relation therewith. A further object of the invention is to provide, in association with such anchorage means, a twister mechanism movable relative to the anchorage means into and out of cooperative relation with wire strand portions held or to be held by the anchorage means. A still further object of the invention is to provide novel twister means mounted for such movement relative to such novel anchorage means.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 4 is a horizontal section, still further enlarged, taken substantially on the line 4—4 of Fig. 3;

Fig. 5 is a transverse section, substantially to the scale of Fig. 4, and taken substantially on the line 5—5 of Fig. 4;

Fig. 6 is a further enlarged, perspective view, showing one of my gripper elements and my novel twister mechanism and shear operatively associated therewith;

Fig. 7 is a bottom plan view of a gripper-finger actuating cam, taken substantially on the line 7—7 of Fig. 5, but drawn to a larger scale and showing the gripper element stem and the gripper-finger studs in section;

Fig. 8 is a transverse section through the twister mechanism shown in Fig. 6;

Fig. 9 is an enlarged perspective view of the bifurcated end of a needle comprising an element of my invention;

Figure 3:
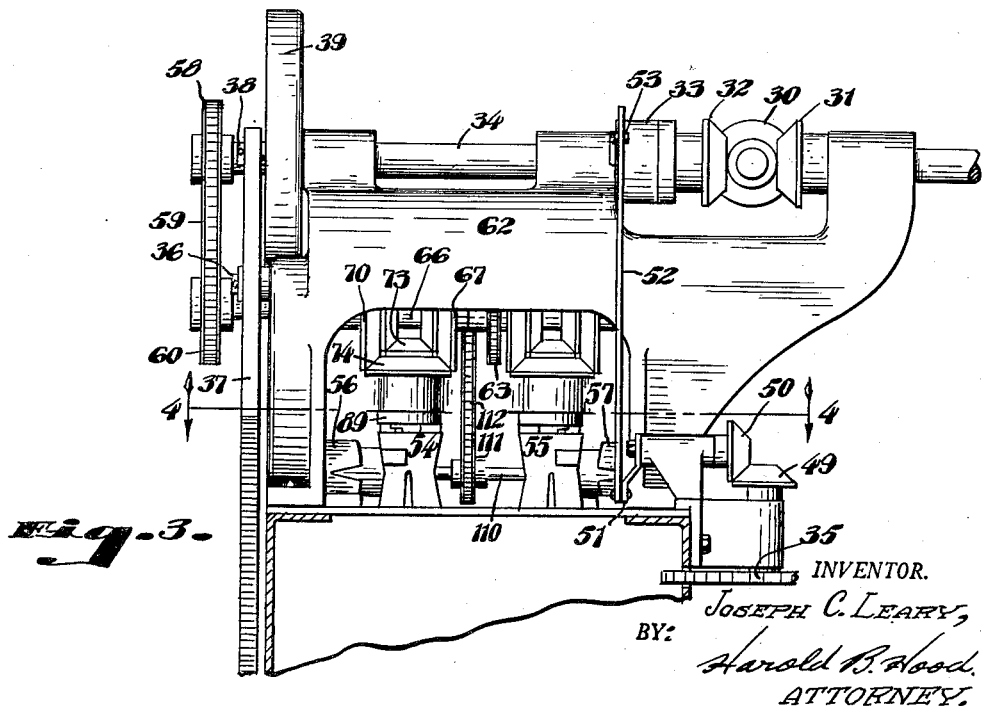
Fig. 3 is a rear elevation, drawn to a further enlarged scale, showing one form of my wire-joining mechanism and actuating means therefor, the view being taken substantially on the line 3—3 of Fig. 2, and parts being shown in section.

Figs. 10 to 15, inclusive, are diagrammatic views illustrating the manner of cooperation of the parts at various progressive stages during the operative cycle of the bale tie of the present invention; and Fig. 16 is a diagrammatic view of the gearing illustrated in Figs. 3 and 5.

Figure 1:
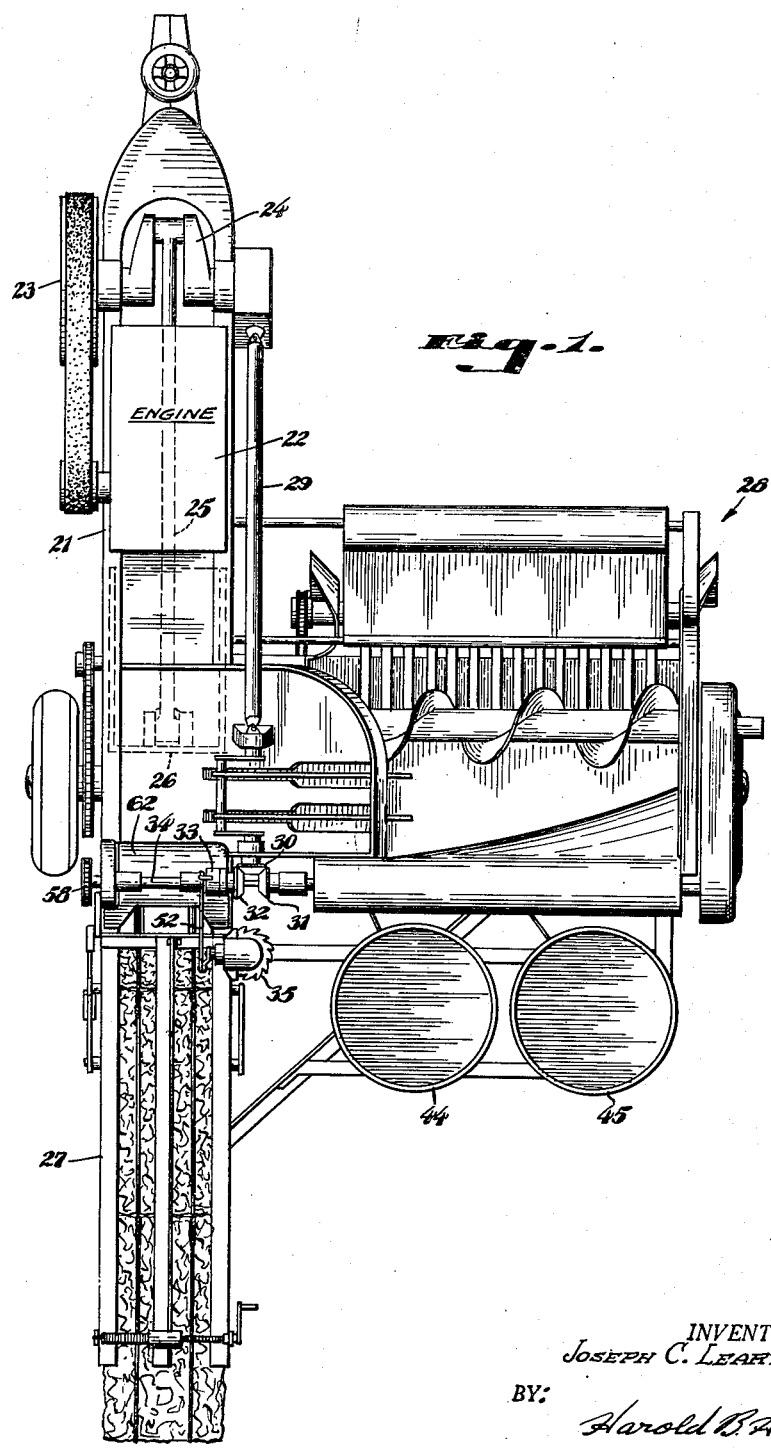
Fig. 1 is a plan view of a commercial form of pick-up baler with which my present bale tie is shown associated either as a built-in feature of the machine or as an attachment or accessory therefor.

Referring more particularly to the drawings, it will be seen that I have illustrated, in Fig. 1, one commercial form of pick-up baler comprising a wheel-supported frame 21 on which is mounted any suitable type of engine 22 connected to drive the frame-supporting wheels and independently connected to drive a shaft 23 having a crank 24 which, through a pitman 25, reciprocates a plunger 26 toward and away from the baling chamber 27. Gathering mechanism, indicated generally by the reference numeral 28, is driven by a take-off shaft 29 and operates to pick up the material to be baled, and to feed such material to the mouth of the baling chamber, in the path of the plunger 26 which acts to force such material, in successive slugs, into and through the baling chamber. The shaft 29 carries a beveled gear 30 meshing with a gear 31 through which the gathering mechanism 28 is driven.

The structure thus far described is conventional, and forms the environment in which my invention finds its primary utility.

The gear 30 meshes also with a further beveled gear 32 driving a single-revolution clutch 33 of conventional construction mounted to drive a shaft 34. Suitably mounted to penetrate a wall of the baling chamber 27 is a toothed wheel 35 arranged to be driven by the passage of compressed material through the baling chamber. The wheel 35 is fixed to a suitably-journalled shaft which carries, also, a beveled gear 49 (Fig. 3) meshing with a beveled gear 50 on a shaft carrying an arm 51. A link 52 connects the arm 51 to actuate a trip lever 53 for the clutch 33, the entire train from the wheel 35 to the lever 53 being so designed that the clutch is tripped to turn the shaft 34 through a single revolution each time a predetermined length of compressed material passes the location of the wheel 35. Suitable means (not shown) well known to the art, may be provided for adjusting the mechanism to vary that predetermined length.

Figure 2:
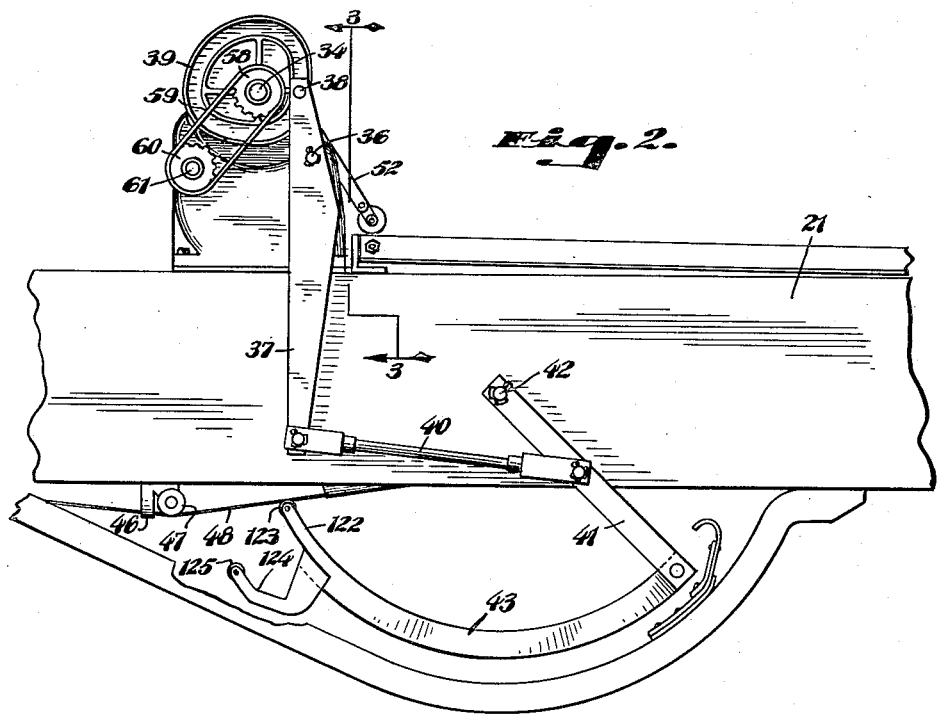
Fig. 2 is a side elevation, drawn to an enlarged scale, showing a fragment of the machine frame and baling chamber, a needle, actuating means therefor, and a part of the actuating mechanism for my wire-joining mechanism.

Pivotally mounted at 36 (Fig. 2) on the frame 62 (Figs. 3 and 5) is a lever 37 provided, near one end, with a stud 38 riding in the guide track of a cam 39 fixed to the shaft 34. A link 40 connects the opposite end of lever 37 with a lever 41 pivoted at 42 to a wall of the baler chamber and carrying, at its free end, a curved needle 43. In the illustrated embodiment of the invention, a second lever (not shown) similar to the lever 41 and carrying a needle (not shown) similar to the needle 43 laterally spaced from the needle 43, will be connected to move therewith. Two wire-supply containers, 44 and 45 (Fig. 1), are conventionally carried on the machine, and a wire strand 48 from the container 44 will be led through an eye 46 (Fig. 2) and about a roller 47 in the plane of operation of the needle 43, while a strand from the container 45 will be lead through a similar eye and about a similar roller (not shown) in the plane of operation of the other needle. Since the two needles and their respective joining mechanisms are identical, only one will be described in detail.

A gripper assembly is provided for each such strand, the gripper assembly for the strand 48 being indicated generally by the reference numeral 54 (Figs. 3, 4 and 5) and the gripper assembly for the other strand being indicated by the reference numeral 55. A shiftable twister unit 56 is operatively associated with the gripper assembly 54, and a shiftable twister unit 57 is similarly associated with the gripper assembly 55, as will more fully appear hereinafter.

A sprocket 58 (Figs. 1, 2, 3 and 5) is fixed to the shaft 34 and, through a chain 59, drives a sprocket 60 fixed to a shaft 61 parallel with the shaft 34 and suitably journalled in the housing 62. A sprocket 63 on said shaft 61 within said housing drives, through a chain 64, a sprocket 65 on another shaft 66 journalled in said housing. Fixed to the shaft 66 are a double Geneva wheel 67 comprising mutilated gear faces 68 and 69, and another double Geneva wheel 70 comprising mutilated gear faces 71 and 72. The faces 68 and 71 coact with a conical gear 73, while the faces 69 and 72 coact with a conical gear 74, the stem 75 of gear 73 being concentrically journalled in the hub of the gear 74 which, in turn, is journalled in a suitable bearing in the housing 62. These several gear faces are illustrated in detail in Fig. 16, in which the axes of wheels 67 and 70 have been turned through opposite angles of 90°, so that the toothing arrangement thereof will be apparent.

The gripper assembly 54 comprises a block (Fig. 6) integral with, or fixed to, the stem 75 and formed to provide a pair of aligned, flaring slots 76 and 76' (Fig. 5) opening through its end face opposite said stem. Spaced above the slot 76 is a notch 77 (Fig. 6) opening into the hollow interior of the block. At one corner, the upper face of the block is recessed, as at 78, to provide a platform on which is mounted an upstanding pivot pin 79 pivotally supporting a gripper finger 80 to oscillate on said platform. The finger 80 is formed with an extension 81 of reduced thickness swingable into and out of closing relation to the notch 77. A stud 82 projects upwardly from the end of the finger 80 remote from the extension 81. Similarly, at the diagonally opposed corner, the upper face of the block is recessed, as at 84, to provide a platform on which is mounted an upstanding pivot pin 85 pivotally supporting a gripper finger 86 to oscillate on said platform. The finger 86 is formed with an extension 87 of reduced thickness swingable into and out of closing relation to a notch 83 similar to the notch 77. A stud 88 projects upwardly from the end of the finger 86 remote from the extension 87.

Integral with, or fixed to, the body of the gear 74 is a cam plate 89 (Figs. 5 and 7) whose lower face abuts the upper surface of the block of the gripper assembly 54. Said lower face of the plate 89 is formed with a continous cam groove indicated generally by the reference numeral 90. As is clearly to be seen in Fig. 7, said cam groove comprises a portion 91, concentric with the stem 75 and spaced slightly radially therefrom, having a peripheral extent somewhat less than 180°, a portion 92 concentric with the stem and more substantially radially spaced therefrom, having a peripheral extent somewhat less than 180°, and two non-concentric portions 93 and 94 joining the ends of the sections 91 and 92. As is indicated, the studs 82 and 88 are received and ride in said cam groove 90, the action being such that, when either of said studs is disposed in the section 91, its corresponding finger extension will be withdrawn from its associated notch 77 or 83, and when either of said studs is disposed in the section 92, its corresponding finger extension will be in closing relation to its associated notch.

The lateral sides of the said block are provided with openings 95 through which may move the twister mechanism 56.

Said twister mechanism comprises a block 96 mounted to slide transversely of the baling frame 21 between guide rails 97. At its end adjacent the gripper assembly, said block is formed with a flaring mouth 98 opening through said block end and leading (preferably radially) into a bore 99 in which are journal mounted the hubs 100 (Fig. 4) of a rotor 101 (Figs. 4, 5 and 8). Said rotor is formed with a radial mouth or slot 102 which, in the rest position of the assembly, registers with the mouth 98 of the block 96. The periphery of the rotor 101 is formed as a spiral gear to mesh with a spiral gear 104 carried by a shaft 105 journalled in said block and projecting upwardly therefrom to carry a conical gear 106. A pin 107 projects from said block and engages in a spiral cam groove 108 (Fig. 4) in a cylindrical cam 109 fixed to a shaft 110 parallel with the shafts 61 and 66. A sprocket 111 fixed to shaft 110 is driven through a chain 112 (Fig. 5) from a sprocket 113 on the shaft 61. The arrangement is such that, as shaft 110 turns through a single revolution, the block 96 will be advanced into the gripper assembly block until the axis of the rotor 101 is aligned with the bases of the slots 76 and 76', held there for a predetermined time, and then withdrawn to its illustrated position.

A shaft 146 is suitably journalled in the housing 62 and carries a mutilated gear 147. As the block 96 is so advanced, the gear 106 passes the (reduced) periphery of the gear 147 and comes to rest in position to be operatively engaged by the toothed face of said gear 147, whereby the rotor 101 will be turned through several (for instance, four) revolutions while the block remains in its advanced position. The shaft 146 and gear 147 are driven, from the shaft 66, by sprockets 148 and 150 connected by chain 149. The reduced portion of the gear 147 again comes into registry with the gear 106 just before the block 96 is withdrawn.

Operation

At the beginning of a bale-forming cycle, the wire strand 48 will have a section 114 thereof (Fig. 10) passed across the baling chamber 27 substantially at the mouth thereof, the extremity of said section being kinked about the extension (for instance, 81) of one of the gripper fingers and turned back outside the associated notch (for instance, 77) of the gripper assembly, as at 115. The stud 82 will now be in the section 92 of the cam groove 90 whereby the tail 115 of wire will be securely anchored. The strand section 114 will, of course, be passed through the registering slots 116 and 117 formed in the baling chamber for that purpose.

Now, as the plunger 26 begins to force material into the baling chamber, the advancing material 118 will carry with it the section 114 of the strand, pulling wire from the container 44 to dispose a strand section 119 along the bottom of the mass of material and a strand section 120 along the top of said mass and turning a strand section 121 into registering slots 76 and 76', of the gripper assembly (Fig. 11). After a predetermined length of material 118 has passed the measuring wheel 35, the clutch 33 will thereby be tripped to cause the shaft 34 to be driven through one revolution.

The free end of the needle 43 is formed to provide furcations 122 and 124 located in a common plane with the wire strand 48 and spaced longitudinally with respect thereto, the furcation 122 preferably carrying a roller 123 and the furcation 124 carrying a roller 125. As the needle moves in a clockwise direction as viewed in Fig. 2, said rollers engage the wire at opposite ends of a section designated by the reference numeral 126 and, as indicated in Fig. 12, carry a section 127 across the baling chamber in close proximity to the trailing end of the compressed material 118. In the "rest" position of the shaft 34, the toothed sections of the faces 68 and 69 are engaged, respectively, with the gears 73 and 74 in the relation indicated in Fig. 16. Thus, as the shaft 34 begins to turn, driving the shaft 66, the gear 73 turns the stem 75 and the block of the twister assembly 54 180° in a counter-clockwise direction as viewed in Fig. 4 to wrap a section 128 of the strand portion 120 about the far side of the block as viewed in Fig. 12. The extremity of the section 121 now points toward the compressed material 118. The toothed section of gear 69 concurrently drives the gear 74 to turn the head 89 correspondingly, so that the fingers 80 and 86 maintain their positions relative to the block 54.

As the needle continues to advance, it lays the mid-portion of the section 128 into the slots 76 and 76' and against the section 121. At this instant, the toothed section of the gear 68 leaves the gear 73, but the gear 69 continues to turn the gear 74 until the stud 88 enters the cam groove section 92 to cause extension 87 of finger 86 to grip the wire between the roller 125 and the base of slot 76'. Concurrently, the stud 82 enters the cam groove section 91 to shift the finger 80 to release the tail 115; but since the wire sections 121 and 128 are wrapped about the block, those sections do not escape from the gripper 54. Now, the cam groove 108 advances the twister mechanism 56 until the contacting sections 121 and 128 within the gripper assembly block are disposed at the base of the slot 102. During this movement, a shear 129 carried by the block 96 coacts with an anvil like that shown at 129' but located adjacent the notch 83, to cut the wire between the finger extension 87 and the base of slot 76'. The teeth of gear 147 now mesh with gear 106 to whirl the rotor 101 to twist said wire sections together; and it will be noted that the extremities of the wire portions being twisted are pointed in opposite directions so that a smooth "screw type" twist will be formed at 131.

Retraction of the needle begins just as the rotor 101 begins to turn. When the twist is completed, the cam groove 108 withdraws the twister mechanism as described above, leaving the parts in the positions of Fig. 14. Now, the toothed section of the gear 71 engages the gear 73 to turn the block of the gripper assembly 180° in a clockwise direction to shed the twisted joint in the manner suggested in Fig. 15; the toothed section of the gear 72 concurrently meshing with the gear 74 to turn the head 89 synchronously with said block. During the final stage of the cycle, the opposite ends of the toothed sections of the gears 68 and 69 engage the gears 73 and 74 respectively, before the parts return to the "rest" relation of Fig. 16, to return the gripper assembly to a position in which the newly-anchored, fresh chamber-traversing strand 114 occupies the position of the strand 114 shown in Fig. 10, to begin a new cycle.

The action of the needle, the gripper assembly and the twister mechanism above described is very rapid, occurring within one revolution of the shaft 34 which, of course, is timed to begin as the plunger 26, on its retractile stroke, clears the position of the needle, and to be completed before the plunger, on its advancing stroke, reaches the path of the needle.

I claim as my invention:

1. For use with a baler comprising a baling chamber and a plunger reciprocable longitudinally with respect thereto, wire-joining mechanism carried adjacent one wall of said chamber near the inlet end thereof, anchorage means positioned adjacent said wire-joining mechanism and having spaced abutments adapted to engage longitudinally spaced points on a wire strand having a bight disposed in said chamber to support and retain therebetween a first section of said strand, a needle normally carried outside an opposite wall of said chamber, a source of supply of wire, means on said needle engaging longitudinally spaced points on said wire strand between said source and said bight to support therebetween a second section of said strand, means for shifting said needle to traverse said chamber, said needle cooperating with said anchorage means to move said second strand section into juxtaposition to said first strand section, means for turning said anchorage means to reverse the positions of said abutments, thereby inverting the position of said first section, before said needle completes its traversal of said chamber, and means for entering said first and second strand sections, while in juxtaposition, into said wire-joining mechanism for joint treatment thereby.

2. For use with a baler comprising a baling chamber and a plunger reciprocable longitudinally with respect thereto, wire-joining mechanism carried adjacent one wall of said chamber near the inlet end thereof, anchorage means positioned adjacent said wire-joining mechanism and supporting an end section of a wire strand having a bight disposed in said chamber, with the terminus of said section directed away from said bight, a needle normally carried outside an opposite wall of said chamber, a source of supply of wire, means on said needle engaging longitudinally spaced points on said wire strand between said source and said bight to support therebetween a second section of said strand, means for shifting said needle to traverse said chamber, said needle cooperating with said anchorage means to move said second strand section into juxtaposition to said first strand section, means for shifting said anchorage means, before said needle completes its traversal of said chamber, to reverse the position of said first strand section and direct the terminus thereof toward said bight, said anchorage means including a device for gripping said second strand section, means for entering said first and second strand sections, while in juxtaposition, into operative association with said wire-joining mechanism for treatment thereby, and means for cutting said second strand section at a point between said gripping means and said wire-joining mechanism to leave a terminus of said second strand section directed away from said bight.

3. In a device of the class described, a gripper assembly comprising a unit formed to provide spaced walls, each of said walls having a slot therein opening through an end of such wall, said slots being arranged in registry, anchorage means carried on said unit adjacent that end of each notch remote from said wall end, means for laying a wire strand, having an end engaged by one of said anchorage means, in said notches in series, means supporting said gripper means for turning movement about an axis intermediate, but substantially parallel with, said notches, means for introducing a second wire strand into said notches in substantial parallel juxtaposition to said first strand, twister mechanism, means for supporting said twister mechanism for movement into and out of the space between said walls, said twister mechanism including a rotor having a slot extending substantially from its center and opening through its periphery, said slot receiving said wire strands when said twister mechanism is positioned between said walls, means for mechanically shifting said twister mechanism between its said positions, and means for rotating said rotor.

4. In a device of the class described, a gripper assembly comprising a unit formed to provide spaced walls, each of said walls having a slot therein opening through an end of such wall, said slots being arranged in registry, anchorage means carried on said unit adjacent that end of each notch remote from said wall end, means for laying a wire strand, having an end engaged by one of said anchorage means, in said notches in series, means supporting said gripper means for turning movement about an axis intermediate, but substantially parallel with, said notches, means for introducing a second wire strand into said notches in substantial parallel juxtaposition to said first strand, means for turning said gripper assembly about said axis through 180° before the introduction of said second strand, twister mechanism, means supporting said twister mechanism for movement into and out of the space between said walls, means for shifting said twister mechanism into its position between said walls after the introduction of said second strand, said twister mechanism including a rotor having a slot extending substantially from its center and opening through its periphery, said slot receiving said wire strands when said twister mechanism is so shifted, and means for rotating said rotor while said strands are engaged in said slot.

5. In a device of the class described, a gripper assembly comprising a unit formed to provide spaced walls, each of said walls having a slot therein opening through an end of such wall, said slots being arranged in registry, anchorage means carried on said unit adjacent that end of each notch remote from said wall end, means for laying a wire strand, having an end engaged by one of said anchorage means, in said notches in series, means supporting said gripper means for turning movement about an axis intermediate, but substantially parallel with, said notches, means for introducing a second wire strand into said notches in substantial parallel juxtaposition to said first strand, means for turning said gripper assembly about said axis through 180° before the introduction of said second strand, means actuating the other of said anchorage means to grip said second strand after the introduction thereof, twister mechanism, means supporting said twister mechanism for movement into and out of the space between said walls, said twister mechanism including a rotor having a slot extending substantially from its center and opening through its periphery, said slot receiving said wire strands when said twister mechanism is positioned between said walls, means for mechanically shifting said twister mechanism between its said positions, and means for rotating said rotor.

6. In a device of the class described, means defining an elongated chamber, a source of supply of wire on one side of said chamber, anchorage means on an opposite side of said chamber for retaining an end of a strand of wire emanating from said source and traversing said chamber, means acting on said wire strand to form and to elongate a bight therein disposed in said chamber, said anchorage means being an element of a gripper assembly comprising a unit formed to provide spaced walls each having a slot opening through an end thereof, said slots registering and being disposed substantially in the plane defined by said bight and opening toward said chamber, said anchorage means being disposed adjacent the closed end of the notch in that wall of said unit remote from said bight and said strand lying in said notches in series, a device including spaced fingers engaging said strand at longitudinally-spaced points between said source and said bight, said device normally lying wholly on the first-mentioned side of said chamber, means acting on said device to move the same to cause said fingers to traverse said chamber to shift that portion of said strand spanning said fingers into said slots, means supporting said unit for turning movement about an axis intermediate said walls and substantially parallel with said slots, means coordinated with said device-moving means for turning said unit through 180° about said axis before said last-named strand portion enters said slots, and means engageable with said strand portions, after entry of said last-named portion into said slots, to join said strand portions.

7. In a device of the class described, means defining an elongated chamber, a source of supply of wire on one side of said chamber, anchorage means on an opposite side of said chamber for retaining an end of a strand of wire emanating from said source and traversing said chamber, means acting on said wire strand to form and to elongate a bight therein disposed in said chamber, said anchorage means being an element of a gripper assembly comprising a unit formed to provide spaced walls each having a slot opening through an end thereof, said slots registering and being disposed substantially in the plane defined by said bight and opening toward said chamber, said anchorage means being disposed adjacent the closed end of the notch in that wall of said unit remote from said bight and said strand lying in said notches in series, a device including spaced fingers engaging said strand at longitudinally-spaced points between said source and said bight, said device normally lying wholly on the first-mentioned side of said chamber, means acting on said device to move the same to cause said fingers to traverse said chamber to shift that portion of said strand spanning said fingers into said slots, means supporting said unit for turning movement about an axis intermediate said walls and substantially parallel with said slots, means coordinated with said device-moving means for turning said unit through 180° about said axis before said last-named strand portion enters said slots, twister means, means for shifting said twister means into and out of the space between said walls, said twister means operatively engaging strand portions lying in said slots only when said twister means is positioned in said space, and means for operating said twister means, while in said space, to join said strand portions.

8. The device of claim 6 including a second anchorage means disposed adjacent the closed end of the other of said slots, and means, operable after entry of said second strand portion into said slots, for actuating said second anchorage means to grip said second strand portion.

9. The device of claim 8 including means synchronized with said joining means for severing said second strand portion at a point between said joining means and said second anchorage means.

10. The device of claim 7 including a second anchorage means disposed adjacent the closed end of the other of said slots, and means, operable after entry of said second strand portion into said slots, for actuating said second anchorage means to grip said second strand portion, and means moving with said twister means for severing said second strand portion at a point between said twister means and said second anchorage means.

11. A gripper assembly for use in a wire-joining mechanism comprising a unit formed to provide spaced walls joined at one end, each wall having a slot opening through its opposite end and extending toward its first-named end, said slots lying in a common plane substantially perpendicular to said walls, each wall further being formed with a notch, near its first-mentioned end, substantially aligned with its slot, a finger for each notch, each finger being mounted for pivotal movement about an axis substantially parallel with the direction of extent of its slot, to move into and out of closing association with its notch, and means for moving said fingers concurrently but oppositely relative to their respective notches.

12. The gripper assembly of claim 11 in which said finger-moving means comprises a cam element, means mounting said cam element for turning movement about an axis parallel with the pivotal axes of said fingers, and means on each finger operatively engaged by said cam element whereby turning movement of said cam element relative to said unit shifts said fingers.

13. The gripper assembly of claim 12 including means supporting said unit for turning movement about an axis coincident with the axis of said cam element, means for turning said unit about said axis, and other means for independently turning said cam element about said axis.

14. In a wire-joining mechanism, a gripper assembly comprising a unit providing spaced walls, means joining said walls adjacent one end thereof, said walls being formed to provide seats for wire sections spanning the space between said walls, said seats having entrances opening through the other ends of said walls, a twister unit, means guiding said twister unit for movement, in a plane substantially parallel with said joining means, into and out of the space between said walls, means for moving said twister unit between such positions, said twister unit comprising a rotor mounted for rotation upon an axis parallel with a line joining said seats, said rotor, when located within said space, being engageable with wires supported on said seats and spanning said space, and means for rotating said rotor.

15. In a wire-joining mechanism, a gripper assembly comprising a unit providing spaced walls joined adjacent one end, said walls being formed to provide seats for wire sections spanning the space between said walls, said seats having entrances opening through the other ends of said walls, a twister unit, means guiding said twister unit for movement, upon a line transverse to the direction in which said seat entrances face, into and out of the space between said walls, means for moving said twister unit between such positions, said twister unit comprising a rotor mounted for rotation upon an axis parallel with a line joining said seats, said rotor, when located within said space, being engageable with wires supported on said seats and spanning said space, and means, operatively engaged with said rotor only when said rotor is located within said space, for driving said rotor about said axis.

16. In a wire-joining mechanism, a gripper assembly comprising a unit providing spaced walls joined adjacent one end, said walls being formed to provide seats for wire sections spanning the space between said walls, said seats having entrances opening through the other ends of said walls, a twister unit, means guiding said twister unit for movement into and out of the space between said walls, means for moving said twister unit between such positions, said twister unit comprising a frame including spaced side walls substantially parallel with said gripper unit walls, each of said side walls being formed with a slot and said slots being disposed in a common plane perpendicular to a plane common to said gripper unit seats and their openings, a rotor journalled between said side walls upon an axis lying in the plane of said slots, said rotor being formed with a slot opening through its periphery, extending to its axis, and normally coinciding with said wall slots, said rotor axis lying, when said twister unit is fully entered between said gripper unit walls, upon a line joining said seats, and means for driving said rotor.

17. In a device of the class described, a gripper assembly comprising a pair of spaced walls adjacent one end, said walls being formed to provide aligned slots for the reception of wire sections spanning the space between said walls, said slots opening through the other ends of said walls, gripper means associated with each of said slots adjacent the joined ends of said walls, respectively, wire joining mechanism mounted at one side of said gripper assembly for movement relative thereto, in a direction transverse to the lengths of said slots into and out of the space between said walls, a shear element mounted to move with said joining mechanism, and anvil means carried by one of said walls in registry with said shear element and beyond said slots, said shear element being cooperable with said anvil to sever a wire when said wire joining mechanism enters said space.

18. The device of claim 17 including means mounting said gripper assembly for turning movement about an axis perpendicular to a line joining said slots and to the line of movement of said wire joining mechanism, and means for turning said gripper assembly through 180° about said axis, each of said walls carrying such anvil means, and said shear element cooperating selectively with said respective anvil means, depending upon the current position of the gripper assembly.

19. The device of claim 18 in which said anvil means is carried on the outer surfaces of said walls and said shear element is laterally spaced from said wire-joining mechanism by substantially the thickness of said walls.

20. The device of claim 17 in which said anvil means is carried on the outer surface of said one wall and said shear element is supported on said wire joining mechanism and laterally spaced therefrom by substantially the thickness of said wall.

JOSEPH C. LEARY.

References Cited in the file of this patent

UNITED STATES PATENTS

| Number | Name | Date |
|---|---|---|
| 761,305 | Johnson | May 31, 1904 |
| 1,232,643 | Wygant | July 10, 1917 |
| 1,309,168 | Wygant | July 8, 1919 |
| 1,990,526 | Claar et al. | Feb. 12, 1935 |
| 2,485,001 | Kane | Oct. 18, 1949 |